(12) United States Patent
Savicki, Jr.

(10) Patent No.: US 7,576,285 B1
(45) Date of Patent: Aug. 18, 2009

(54) MODULAR WALL PLATE FOR GANGING COMMERCIAL DIMMERS

(75) Inventor: Gerald R. Savicki, Jr., Canastota, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 206 days.

(21) Appl. No.: 11/674,452

(22) Filed: Feb. 13, 2007

(51) Int. Cl.
*H02G 3/14* (2006.01)
(52) U.S. Cl. .............................. 174/66; 174/67; 174/61; 174/53; 200/43; D13/156
(58) Field of Classification Search .................. 174/66, 174/67, 61, 53; 220/241, 242, 3.2–3.8; 200/43.16, 200/43.21; D13/156, 177
See application file for complete search history.

(56) References Cited

U.S. PATENT DOCUMENTS

| | | | | |
|---|---|---|---|---|
| 2,012,875 | A * | 8/1935 | Guett | 174/66 |
| 4,972,045 | A * | 11/1990 | Primeau | 174/66 |
| 5,700,978 | A | 12/1997 | Huff | |
| 6,172,301 | B1 * | 1/2001 | Goodsell | 174/66 |
| 6,949,708 | B1 * | 9/2005 | Hausen et al. | 174/66 |
| 7,270,436 | B2 * | 9/2007 | Jasper | 362/95 |

* cited by examiner

*Primary Examiner*—Dhiru R Patel
(74) *Attorney, Agent, or Firm*—Daniel P. Malley; Bond, Schoeneck & King, PLLC (57) ABSTRACT

The present invention is directed to a modular wall plate system accommodating N-wiring devices within a wall box. N is an integer greater than or equal to one (1). The system includes a left-end cap configured to be mounted to an exterior portion of a left most wiring device of the N-wiring devices disposed in the wall box, the left-end cap including a left-end cap finish surface. A right-end cap is configured to be mounted to an exterior portion of a right most wiring device of the N-wiring devices disposed in the wall box, the right-end cap including a right-end cap finish surface. N-1 alignment couplers are disposed between each of the N-wiring devices. The N-1 alignment couplers are configured to align adjacent ones of the N-wiring devices at least in two-dimensions. Each of the N-1 alignment couplers includes a coupler finish surface. N-wall plates are configured to cover each of the N-wiring devices. Each of the N-wall plates includes a wall plate finish surface.

47 Claims, 6 Drawing Sheets

FIGURE 1

CONVENTIONAL ART

MODULAR WALL PLATE FOR GANGING COMMERCIAL DIMMERS

BACKGROUND OF THE INVENTION

1. Field of the Invention

The present invention relates generally to wall plates for electrical wiring devices, and particularly to wall plates for commercial dimmers.

2. Technical Background

Multi-gang device boxes are configured to accommodate multiple wiring devices side by side. The multi-gang box includes several pairs of mounting tabs, each pair being separated from an adjacent pair of mounting tabs by a standard distance, such as 1.812 inches. This standard distance is commonly referred to as a "single-gang width." Of course, each pair of mounting tabs includes a fastener aperture disposed in the top wall of the box and a corresponding fastener aperture disposed in the bottom wall of the box. The centerline passing through the top and bottom fastener holes of each pair is substantially parallel to the side walls of the box. Each device mounted in the multi-gang box is fastened to the top and bottom holes by inserting a fastener screw therein. There is typically some play between the wiring device and the mounting holes in the multi-gang junction box so the installer can compensate for a junction box that has not been perfectly aligned during installation. This gives rise to the problem that the wiring devices are not aligned to each other by the box.

The present invention is directed to commercial dimmer wiring devices. A one (1) gang dimmer, of course, is configured to be disposed within a single gang width. As the name suggests, 1½ gang dimmers, 2 gang dimmers and 2½ gang dimmers require a 1½ gang width, a 2 gang width and a 2½ gang width, respectively. The dimmer size relates to the wattage of the load it is related to control. The load current causes a certain amount of heating in the dimmer itself such that the greater the load current, the greater the amount of heating. The heat generated by the dimmer must be dissipated by a heat sink. The heat sink is typically implemented using a thermally conductive plate member that has a surface area greater than the "footprint" of the dimmer itself. It is the heat sink area that typically establishes the size of the dimmer.

The dimmer mounts to the multi-gang box by way of fasteners that pass through holes in the heat sink that are in alignment with mounting tab holes. There are redundant pairs of holes in the top and bottom of the heat sink. This allows the installer to align the box to the closest available pair of mounting tab holes. In some dimmers, the portion of the heat sink overhanging the side of the dimmer is scored. The score lines permit the installer to snap-off and physically remove edge portions of the heat sink. The removable edge portions are often referred to as heat sink "fins." The fins are removed for a variety of reasons and provide the installer with flexibility. Regardless of whether or not the dimmer includes fins and whether or not the fins have been removed, adjacent dimmers are mounted inside the box edge to edge without wasted box space.

Figure 1:
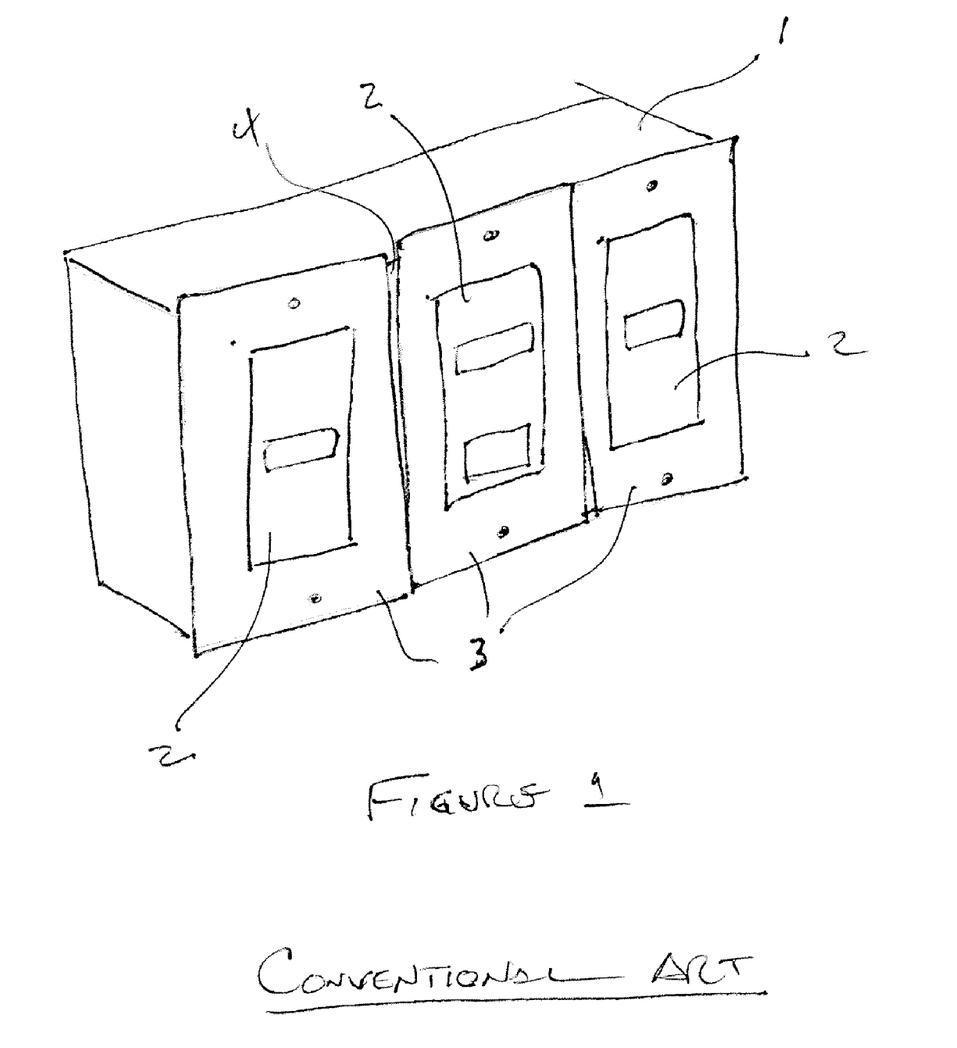
FIG. 1 is a perspective view of a conventional approach to multi-gang wall plate installation.

Referring to FIG. 1, after the dimmers 2 are mounted, one or more wall plates 3 must be mounted to the multi-gang box 1 to cover them. In one approach, the installer attempts to install one individual wall plate over each dimmer mounted on the box. The installer then tries to attach the individual wall plates on the box such that they abut each other edge-to-edge. However, the individual dimmers are usually not perfectly aligned with each other. The edges of the heat sinks may be raised relative to each other, the side edges of the heat sink may not be vertically aligned with each other, and the bottom edges of the heat sink may not be in perfect horizontal alignment. Because the individual dimmers are not perfectly aligned with each other in three-dimensional space, the wall plates will not be perfectly aligned either. The wall plates will exhibit a stepped appearance that is both unacceptable and undesirable. The edges of the individual wall plates look rough and non-uniform. This is further exacerbated when dimmers of different width are installed. In this case, certain wall plates may be used that have score lines that allow installers to snap of unwanted portions. At the end of the day, the installer will view the installed wall plates, find them to be grossly out of alignment, remove the wall plates, and start over in an attempt to perfectly align the dimmers. This procedure may be repeated several times before the installer gets it right or gives up.

In another approach that has been considered, designers avoid the use of individual plates by ordering a custom plate to fit over the entire ensemble of dimmers. The drawbacks to this approach are the cost and lead time of having a custom wall plate manufactured. Both of these factors are usually prohibitive.

As can be seen, an alignment issue arises whenever wiring devices of dissimilar width are installed in a multi-gang junction box. Although the problem has been described with respect to commercial dimmers, other voltage controllers such as fan speed controllers, dehummers (a type of fan speed controller), and combination dimmer/fan speed controllers are also germane. The size of a voltage controller may relate to the inclusion of other wiring device features such as switches, receptacles, sensors, or lights. Alternatively, such wiring devices may not be combined with a voltage controller. Instead, they are disposed as separate wiring devices elsewhere in the multi-gang junction box, further increasing the variety of wiring device widths.

What is needed, therefore, is a system that addressees the needs described above. In particular, a modular wall plate system is needed that conveniently gangs dimmers of varying widths together in a multi-gang box in an aesthetically pleasing way.

SUMMARY OF THE INVENTION

The present invention addresses the needs described above by providing a modular wall plate system is needed that conveniently gangs dimmers of varying widths together in a multi-gang box in an aesthetically pleasing way.

One aspect of the present invention is directed to a modular wall plate system accommodating N-wiring devices within a wall box. N is an integer greater than or equal to one (1). The system includes a left-end cap configured to be mounted to an exterior portion of a left most wiring device of the N-wiring devices disposed in the wall box, the left-end cap including a left-end cap finish surface. A right-end cap is configured to be mounted to an exterior portion of a right most wiring device of the N-wiring devices disposed in the wall box, the right-end cap including a right-end cap finish surface. N-1 alignment couplers are disposed between each of the N-wiring devices. The N-1 alignment couplers are configured to align adjacent ones of the N-wiring devices at least in two-dimensions. Each of the N-1 alignment couplers includes a coupler finish surface. N-wall plates are configured to cover each of the N-wiring devices. Each of the N-wall plates includes a wall plate finish surface.

In another aspect, the present invention is directed to a method for installing N-wiring devices within a wall box. N is an integer greater than or equal to one (1). The method includes the steps of providing a left most wiring device of the N-wiring devices having a left-end cap mounted to an exterior portion of a left most wiring device, the left-end cap including a left-end cap finish surface; providing a right most wiring device of the N-wiring devices having a right-end cap mounted to an exterior portion of a right most wiring device, the right-end cap including a right-end cap finish surface; loosely mounting the remaining N-2 wiring devices to the wall box; inserting N-1 alignment couplers between each of the N-wiring devices, each of the N-1 alignment couplers including a coupler finish surface, each of the N-1 alignment couplers including at least one fastening device disposed on either side of the coupler finish surface; mounting each of the at least one fastening devices to an adjacent one of the N-wiring devices to thereby form a system of coupled and aligned wiring devices; connecting the system of coupled and aligned wiring devices to the wall box; and covering each of the N-wiring devices with a wall plate.

In yet another aspect, the present invention is directed to a modular wall plate system accommodating N-wiring devices within a wall box. N is an integer greater than or equal to one (1). The system includes a left-end cap configured to be mounted to an exterior portion of a left most wiring device of the N-wiring devices disposed in the wall box. The left-end cap includes a left-end cap finish surface. A right-end cap is configured to be mounted to an exterior portion of a right most wiring device of the N-wiring devices disposed in the wall box. The right-end cap includes a right-end cap finish surface. N-1 alignment couplers are disposed between each of the N-wiring devices. The N-1 alignment couplers are configured to align adjacent ones of the N-wiring devices at least in two-dimensions. Each of the N-1 alignment couplers including a coupler finish surface. N-wall plates are configured to cover each of the N-wiring devices. Each of the N-wall plates includes a wall plate finish surface and at least one series of venting slits disposed therein. The left-end cap finish surface, the right-end cap finish surface, the coupler finish surface(s), if any, and the wall plate finish surface(s) are substantially co-planar after the modular wall plate system accommodating N-wiring devices is installed within the wall box.

In yet another aspect, the present invention is directed to a modular wall plate system accommodating N-wiring devices within a wall box. N is an integer greater than or equal to one (I). The system includes a left-end cap configured to be mounted to an exterior portion of a left most wiring device of the N-wiring devices disposed in the wall box. The left-end cap includes a left-end cap finish surface. A right-end cap is configured to be mounted to an exterior portion of a right most wiring device of the N-wiring devices disposed in the wall box. The right-end cap includes a right-end cap finish surface. N-1 alignment couplers are disposed between each of the N-wiring devices. The N-1 alignment couplers are configured to align adjacent ones of the N-wiring devices at least in two-dimensions. Each of the N-1 alignment couplers including a coupler finish surface. N-wall plates are configured to cover each of the N-wiring devices. Each of the N-wall plates includes a wall plate finish surface and a label window configured to hold a placard therein. The left-end cap finish surface, the right-end cap finish surface, the coupler finish surface(s), if any, and the wall plate finish surface(s) are substantially co-planar after the modular wall plate system accommodating N-wiring devices is installed within the wall box.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 4 is a plan view illustrating a subsequent step of installing the system depicted in FIG. 8;

FIG. 5 is a plan view showing a completed installation of the system depicted in FIG. 9;

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the modular wall plate system of the present invention is shown in FIG. 2, and is designated generally throughout by reference numeral 10.

Figure 2:
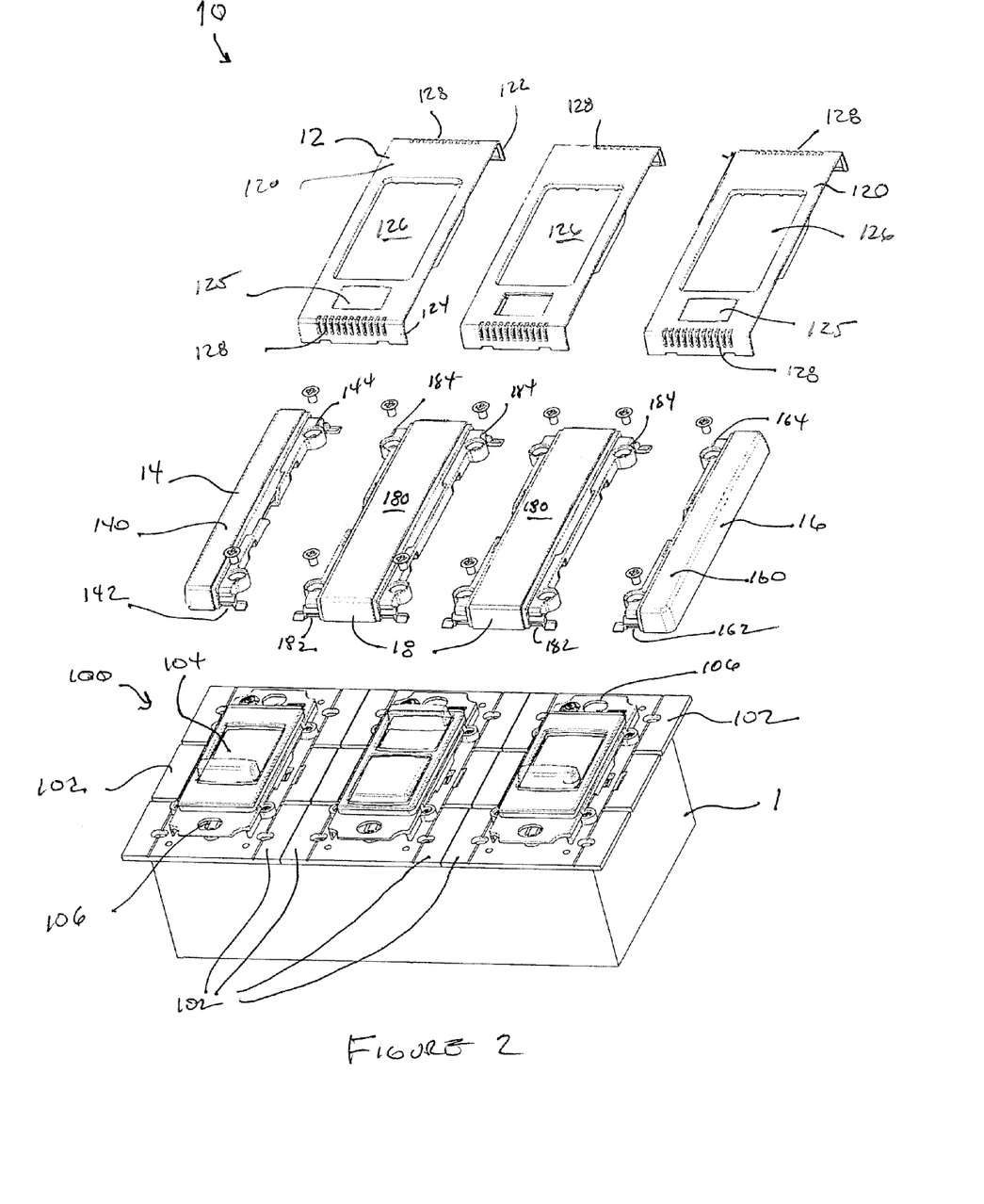
FIG. 2 is an exploded view of a modular wall plate system in accordance with a first embodiment of the present invention.

As embodied herein, and depicted in FIG. 2, an exploded view of a modular wall plate system 10 in accordance with a first embodiment of the present invention is shown. Referring to FIG. 2, three dimmer wiring devices 100 are shown disposed in multi-ganged wall box 1. Each device 100 includes heat sink fins 102 disposed on either side of the device 100. Each device 100 also includes a user-accessible control feature 104 disposed on the device. The control feature may be a slide switch, a set switch, or any combination thereof. In other embodiments, the wiring devices 100 may include receptacles, protective devices, GFCIs, AFCIs, TVSS devices, lights, sensors, occupancy sensors, fan speed controllers, as well as dimmer devices. An individual device 100 may include more than one wiring device function, e.g. a dimmer and fan speed controller or a receptacle and a night light.

Reference is made to U.S. patent application Ser. No. 11/343,102, which is incorporated herein by reference as though fully set forth in its entirety, for a more detailed explanation of dimmer wiring devices.

The modular wall plate system may accommodate N-wiring devices within an N-gang wall box. N, of course, is an integer greater than or equal to one (1). The system includes a left-end cap 14 that is configured to be mounted over the heat sink 102 of the left most dimmer device shown in the FIG. 2. Left-end cap 14 includes a left-end cap finish surface 140 that is raised relative to the pair of recessed fastener holes 144 disposed on the right hand portion of the end cap. The pair of the recessed fastener holes 144 are configured to be mounted to the left-most edge of wiring device 100.

Modular system 10 includes N-1 alignment couplers 18 disposed between each of the N-wiring devices 100. In the example shown, there are three wiring devices 100, and therefore, two alignment couplers 18. The alignment couplers 18 are configured to be mounted to and align adjacent wiring devices 100 in the manner shown. Each of the alignment couplers 18 includes a coupler finish surface 180 disposed in the middle thereof. The couplers 18 further include a pair of recessed fastener holes 184 disposed on either side of the coupler finish surface 180. Each pair of the recessed fastener holes 184 are configured to be mounted to a heat sink edge portion 102 of the wiring device 100. The alignment couplers are configured to align adjacent wiring devices in three dimensions.

A right-end cap 16 is configured to be mounted to an exterior heat sink portion of the right most wiring device shown in FIG. 2. The right-end cap 16 includes a right-end cap finish surface 160 that is raised relative to the pair of recessed fastener holes 164 disposed on the left hand portion of the end cap. The pair of the recessed fastener holes 164 are configured to be mounted to the left-most edge of wiring device 100, which in this case is a heat sink fin.

Finally, the modular system includes N-wall plates 12 configured to cover each of the N-wiring devices 100. Again, in the example provided, N equals three. The present invention, however, should not be construed as being thus limited. Each wall plate 12 is C-shaped and includes a central portion 120, a top edge 122 and a bottom edge 124. The central portion is characterized by a wall plate finish surface that matches the finish surfaces of the end-caps (14, 16) and the couplers 18. Central portion 120 includes a wiring device aperture 126 disposed therein. The aperture 126 is configured to provide a user with access to the wiring device control feature 104. A label window 125 is disposed underneath the wiring device aperture 126. Heat sink vents 128 are formed in top edge 122 and in bottom edge 124.

Figure 3:
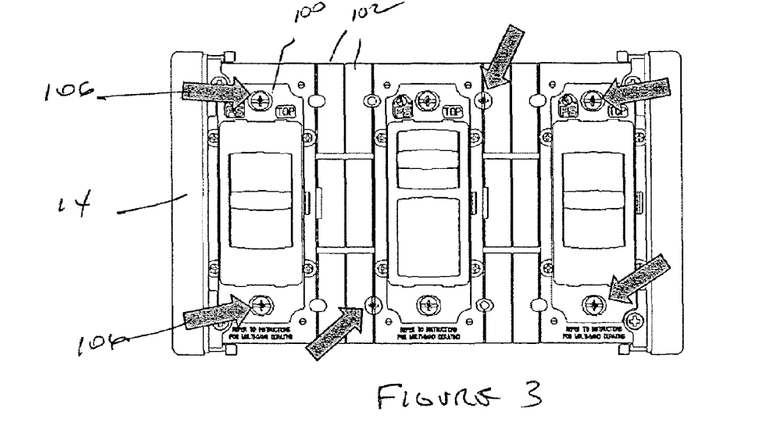
FIG. 3 is a plan view illustrating an initial step of installing the system depicted in FIG. 2.
Figure 4:
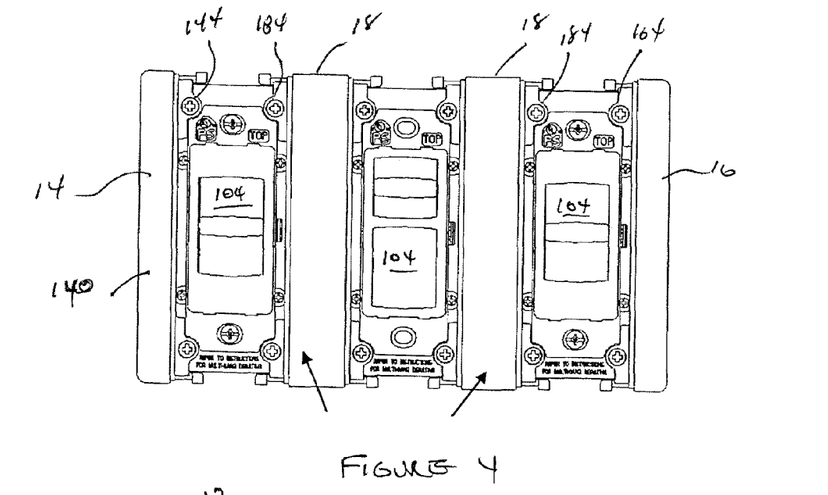
FIG. 4 is a plan view illustrating a subsequent step of installing the system depicted in FIG. 2.
Figure 5:
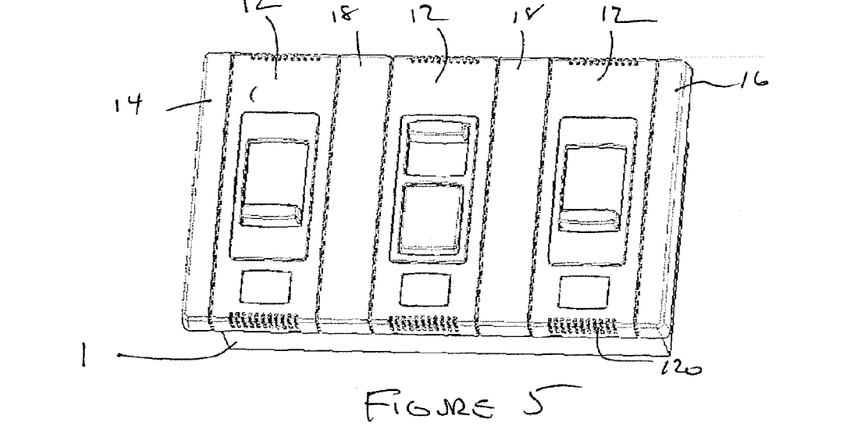
FIG. 5 is a plan view showing a completed installation of the system depicted in FIG. 2.

A method for installing the modular wall plate system of the present invention will presently be described in reference to FIGS. 3-5. Although an array of dimmers is shown for purposes of illustration, any wiring devices, including those named above could have equally been shown. As an initial step, a wall box having the correct size must be selected. The selection is based on whether the dimmers are narrow one gang dimmers, 1½ gang, 2-gang or 2½ gang devices. The second consideration relates to whether the heat sink fins 102 are removed or left intact. In the example depicted in FIGS. 3-5, the heat sink fins are left intact. Accordingly, those of ordinary skill in the art will recognize that given the same number of wiring devices, the overall wall box 1 size is necessarily larger. After the wall box is selected and installed, the desired sequence of each dimmer to be installed is decided. In one embodiment of the present invention, the dimmer wiring devices may be sold with end-caps (14, 16) disposed on each device. In this instance, the end-caps for interior wiring devices 100 are removed. The right end cap 16 of the left-most wiring device and the left-end cap 14 of the right-most device are also removed.

Referring to FIG. 3, a plan view illustrating an initial step of installing the system 10 depicted in FIG. 2 is shown. In this view, the wiring devices are installed in the wall box with the mounting screw (at 106) finger tight to allow a small amount of movement. In FIG. 4, the couplers 18 are installed between the adjacent wiring devices. After the couplers 18 are installed, the wall plates 12 are installed as shown in FIG. 5. The wall plates 12 are configured to snap to an end cap and coupler, or to two couplers. Alternatively, the wall plates fasten to the wiring device by way of snaps or screws. The screws may be made out of a thermally non-conductive material.

When the installation is complete, the left-end cap finish surface, the right-end cap finish surface, the coupler finish surfaces, and the wall plate finish surfaces are substantially co-planar. In fact, the modular wall plate system aligns the wiring devices in three-dimensional space within the wall box.

As has been described, the couplers, end caps and wall plates are aligned and have a substantially uniform finish surface to give the completed assembly a uniform appearance. On the other hand, these surfaces may be intentionally made to differ from each other for some ornamental or functional reason. The finish surfaces of the couplers may be recessed or raised with respect to the finish surfaces of the wall plates and/or end plates. The finish surfaces of the wall plates, end plates, and/or couplers may be convex. The convex surface in the given finish surface may be in a portion of either the width or length dimension, or both. The finish surfaces of the couplers may have a different color than the finish surfaces of the wall plates and/or end plates. The finish surfaces of the end plates, couplers, and wall plates may have differing textures or degrees of luster. The finish surfaces of the end plates, couplers and wall plates may be made out of differing materials such as metal or plastic.

Figure 6:
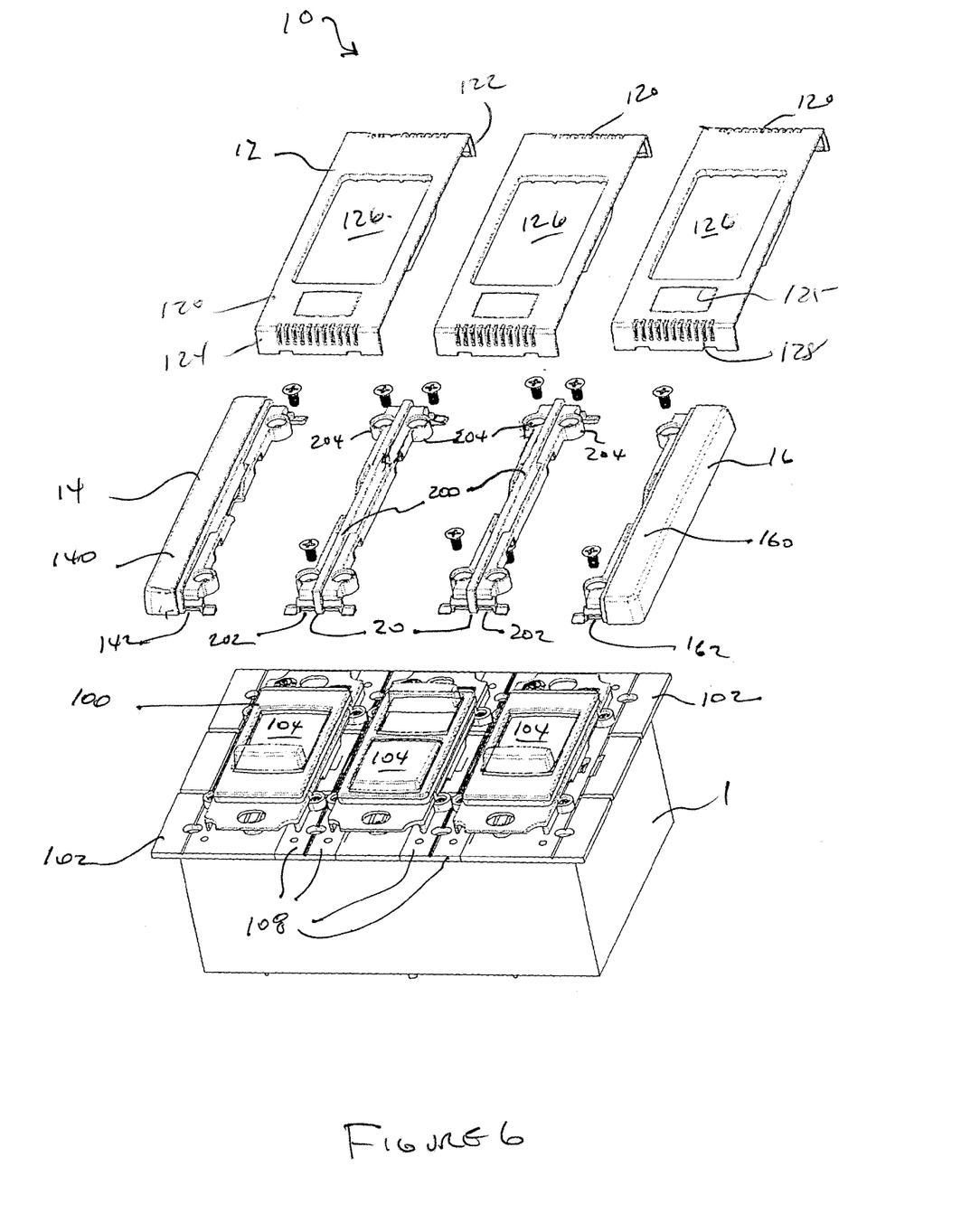
FIG. 6 is an exploded view of a modular wall plate system in accordance with a second embodiment of the present invention.

As embodied herein and depicted in FIG. 6, an exploded view of a modular wall plate system in accordance with a second embodiment of the present invention is disclosed. In this embodiment, three dimmer wiring devices 100 are again shown disposed in multi-ganged wall box 1. However, each interior heat sink fin, i.e., those that are not disposed at the edge of the wall box 1 are removed from the wiring devices 100.

The system includes a left-end cap 14 that is configured to be mounted over the heat sink 102 of the left most dimmer device shown in the FIG. 2. As before, left-end cap 14 includes a left-end cap finish surface 140 that is raised relative to the pair of recessed fastener holes 144 disposed on the right hand portion of the end cap. The pair of the recessed fastener holes 144 are configured to be mounted to the left-most edge of wiring device 100. A right-end cap 16 is configured to be mounted to an exterior heat sink portion of the right most wiring device shown in FIG. 2. The right-end cap 16 includes a right-end cap finish surface 160 that is raised relative to the pair of recessed fastener holes 164 disposed on the left hand portion of the end cap. The pair of the recessed fastener holes 164 are configured to be mounted to the left-most edge of wiring device 100, which in this case is a heat sink fin.

N-1 alignment couplers 20 are disposed between each of the N-wiring devices 100. In the example shown, there are three wiring devices 100, and therefore, two alignment couplers 20. In this embodiment, the couplers 20 are relatively narrow because the interior heat sink fins 102 are removed.

The narrow alignment couplers 20 are configured to be mounted to the adjacent wiring devices 100 in the manner shown. Each of the alignment couplers 20 includes a very narrow coupler finish surface disposed between pairs of recessed fastener holes 204 disposed on either side. Each pair of the recessed fastener holes 204 are configured to be mounted to a portion 108 of the wiring device 100 where the heat sink fin 102 was removed. The alignment couplers 20 are configured to align adjacent wiring devices 100 in three dimensional space.

Of course, the second embodiment of the present invention also includes N-wall plates 12 (in the non-limiting example provided, N again equals three) configured to cover each of the N-wiring devices 100. The wall plates shown herein are exactly the same as those shown in FIGS. 2-5. Each wall plate 12 is C-shaped and includes a central portion 120, a top edge 122 and a bottom edge 124. The central portion is characterized by a wall plate finish surface that matches the finish surfaces of the end-caps (14, 16) and the couplers 18. Central portion 120 includes a wiring device aperture 126 disposed therein. The aperture 126 is configured to provide a user with access to the wiring device control feature 104. Each wall plate includes heat sink vents 128 disposed in top and bottom edges 122, 124, respectively. A label window 125 is also provided in the central portion 120.

Figure 7:
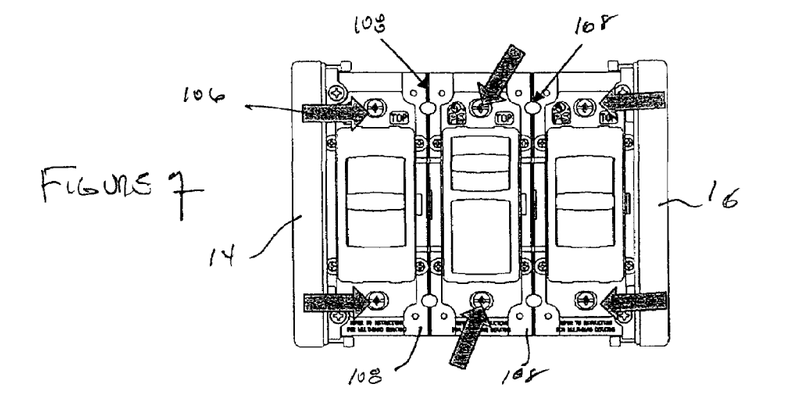
FIG. 7 is a plan view illustrating an initial step of installing the system depicted in FIG. 6.
Figure 8:
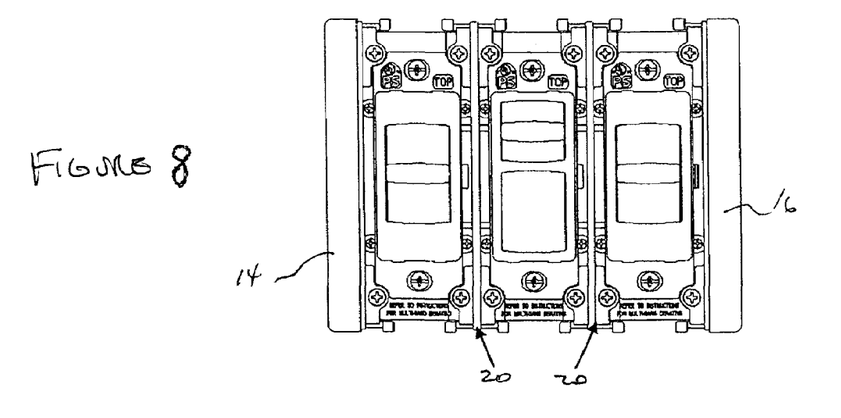
Figure 9:
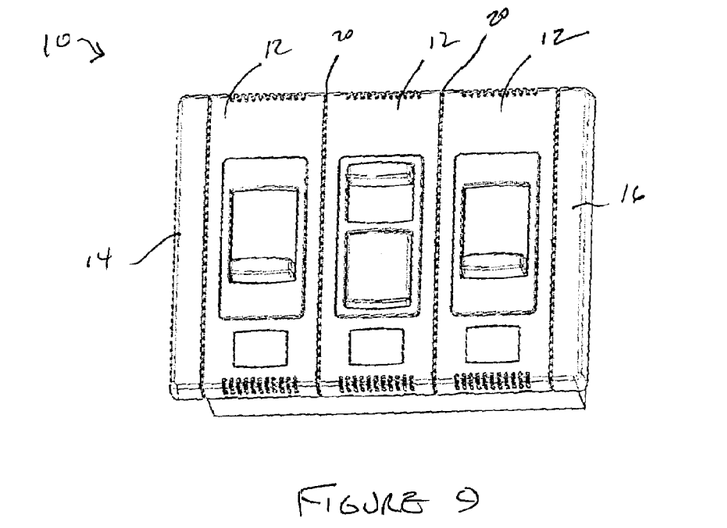

A method for installing the modular wall plate system of the present invention will presently be described in reference to FIGS. 7-9. Again, as an initial step, a wall box having the correct size must be selected. The selection is based on whether the dimmers are narrow one gang dimmers, 1½ gang, 2-gang or 2½ gang devices. The second consideration relates to whether the heat sink fins 102 are removed or left intact. In the example depicted in FIGS. 7-9, the heat sink fins are removed. Accordingly, those of ordinary skill in the art will recognize that given the same number of wiring devices, the overall wall box 1 size will be smaller than if the fins 102 were left intact. After the wall box is selected and installed, the desired sequence of each dimmer to be installed is decided.

In one embodiment of the present invention, the dimmer wiring devices may be sold with end-caps (14, 16) disposed on each device. In this instance, the end-caps for interior wiring devices 100 are removed. The right end cap 16 of the left-most wiring device and the left-end cap 14 of the right-most device are also removed. The final step before installation begins is to remove the interior heat sink fins. This may be accomplished by using a vise or a set of heavy duty pliers.

Referring to FIG. 7, the wiring devices 100 are disposed in the wall box with the mounting screws (at 106) only finger tight to allow a small amount of movement. In FIG. 8, the narrow couplers 20 are disposed between the adjacent wiring devices, the fasteners are installed in fastener holes 202, and the screws are tightened. After the couplers 20 are installed, the wall plates 12 are installed as shown in FIG. 9. Note that in this embodiment, the raised surface of the couplers 20 almost not noticeable.

When the installation is complete, the left-end cap finish surface, the right-end cap finish surface, the coupler finish surfaces, and the wall plate finish surfaces are substantially co-planar. The modular wall plate system aligns the wiring devices in three-dimensional space within the wall box.

Figure 10:
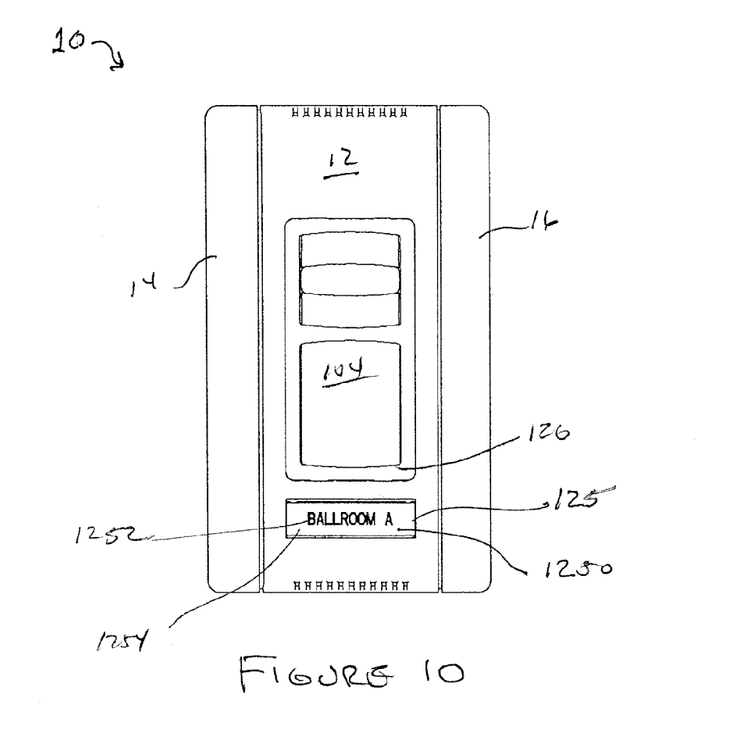
FIG. 10 is a plan view showing a wall plate placard holder in accordance with another embodiment of the present invention.

Referring to FIG. 10, a plan view showing a wall plate placard holder 125 in accordance with another embodiment of the present invention is disclosed. Again, placard holder 125 is disposed beneath aperture 126 and may be used to provide the user with identification information. Placard holder 125 includes a lens 1250 disposed in label aperture 1252. A printed placard 1254 may be viewed via lens 1250.

Figure 11:
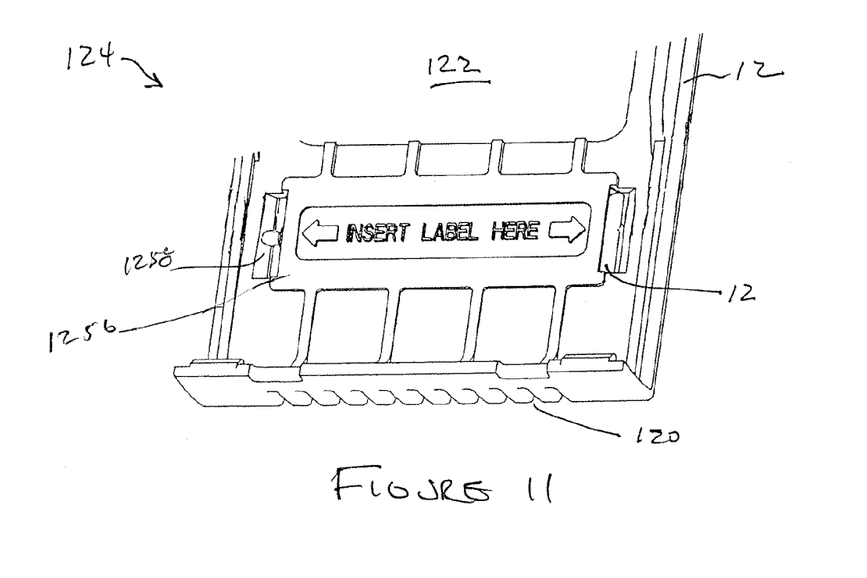
FIG. 11 is a detail view of the placard holder depicted in FIG. 10.

FIG. 11 is a detail view of the placard holder 125 depicted in FIG. 10 as view from the underside of wall plate 12. A backing member 1256 is disposed behind lens 1250 and accommodates placard 1254 therebetween. Backing member 1256 is integrally formed with wall plate 12. Both lens 1250 and placard 1254 are not seen in this view because they are disposed behind backing member 1256. Backing member 1256 includes a pocket 1258 disposed on either side of the backing member 1256. The pocket 1258 allows the placard to be inserted between the backing member 1256 and the lens portion 1250. One salient feature of the present invention is that the user need not remove the lens member 1250 to change the placard 1254. The user will unsnap the wall plate 12 and gain access from the underside of plate 12, in the manner shown herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A modular wall plate system accommodating N-wiring devices within a wall box, N being an integer greater than or equal to one (1), the system comprising:

a left-end cap configured to be mounted to an exterior portion of a left most wiring device of the N-wiring devices disposed in the wall box, the left-end cap including a left-end cap finish surface;

a right-end cap configured to be mounted to an exterior portion of a right most wiring device of the N-wiring devices disposed in the wall box, the right-end cap including a right-end cap finish surface;

N-1 alignment couplers disposed between each of the N-wiring devices, the N-1 alignment couplers being configured to align adjacent ones of the N-wiring devices at least in two-dimensions, each of the N-1 alignment couplers including a coupler finish surface; and N-wall plates configured to cover each of the N-wiring devices, each of the N-wall plates including a wall plate finish surface.

2. The system of claim 1, wherein the left-end cap finish surface and the right-end cap finish surface are substantially co-planar after the N-wiring devices is installed within the wall box.

3. The system of claim 2, wherein the coupler finish surface(s) are substantially co-planar with the left-end cap finish surface after the N-wiring devices is installed within the wall box.

4. The system of claim 2, wherein at least one of the N-wall plate finish surface(s) is substantially co-planar with the left-end cap finish surface after the modular wall plate system accommodating N-wiring devices is installed within the wall box.

5. The system of claim 2, wherein at least one of the N-wall plate finish surface(s) is at a predetermined spaced relationship with respect to the left-end cap finish surface after the modular wall plate system accommodating N-wiring devices is installed within the wall box.

6. The system of claim 1, wherein the N-wiring devices are substantially aligned in three-dimensional space after the modular wall plate system accommodating N-wiring devices is installed within the wall box.

7. The system of claim 1, wherein each of the N wall plates are configured to mate to two (2) of a group selected from the left-end cap, the right-end cap, and the N-1 alignment couplers.

8. The system of claim 7, wherein one of the N-wall plates is configured to snap into the left-end cap mounted to the left-most wiring device and snap into an alignment coupler mounted to a right-edge of the left most wiring device.

9. The system of claim 7, wherein one of the N-wall plates is configured to snap into the right-end cap mounted to the right-most wiring device and snap into an alignment coupler mounted to a left-edge of the right most wiring device.

10. The system of claim 9, wherein at least one of the N-wall plates is configured to secure to a corresponding wiring device by way of a fastening structure.

11. The system of claim 7, wherein selected ones of the N-wall plates are configured to snap into adjacent ones of the N-1 alignment couplers.

12. The system of claim 1, wherein a wall plate of the N-wall plates is characterized by a horizontal dimension corresponding to a size of the corresponding wiring device.

13. The system of claim 12, wherein the size is selected from a group of wiring device sizes selected from a group that includes single gang, one- and one-half gang, two-gang, and two and one-half gang sizes.

14. The system of claim 13, wherein the wiring devices include a dimmer, fan speed control, switch, sensor, light, receptacle, protective device, transient voltage surge suppressor (TVSS), ground fault circuit interrupter (GFCI), or some combination thereof.

15. The system of claim 13, wherein the one of the wiring devices includes a dimmer and a fan speed control.

16. The system of claim 1, wherein at least one of the N-wall plates includes a label window configured to hold a placard therein.

17. The system of claim 16, wherein the label window is accessible from an underside of the wall plate.

18. The system of claim 1, wherein the N-1 alignment couplers may be selected from a group of alignment couplers including a relatively narrow coupler configured to be mounted to a dimmer wiring device having a heat sink fin removed.

19. The system of claim 1, wherein the N-1 alignment couplers may be selected from a group of alignment couplers including a relatively wide coupler configured to be mounted to a dimmer wiring device having a heat sink fin intact.

20. The system of claim 1, wherein the N-1 alignment couplers are selected from a family of alignment couplers provided in at least two widths.

21. The system of claim 1, wherein each of the N-1 couplers includes at least one pair of fastener structures disposed on either side of the coupler finish surface, each pair of the fastener structures being configured to mount and align the edges of two wiring devices with respect to each other.

22. The system of claim 1, wherein the left-end cap includes a pair of recessed fastener holes disposed on a right side portion, the pair of the recessed fastener holes being configured to mount and align an edge of a wiring device thereto.

23. The system of claim 1, wherein the right-end cap includes a pair of recessed fastener holes disposed on a left side portion, the pair of the recessed fastener holes being configured to mount and align an edge of a wiring device thereto.

24. The system of claim 1, wherein at least one of the N-wall plates includes a series of vent holes disposed therein, the series of vent holes being configured to vent thermal energy generated by a dimmer heat sink.

25. The system of claim 24, wherein the series of vent holes are disposed in at least one outer edge of the at least one face plate.

26. The system of claim 1, wherein each pair of adjacent wall plates of the N-wall plates includes one of the N-1 couplers disposed therebetween such that there is substantially no air gap disposed between the adjacent wall plates.

27. The system of claim 1, wherein each of the N-wall plates includes an opening corresponding to a user-accessible wiring device control feature.

28. The system of claim 27, wherein the user-accessible wiring device control feature is selected from a group of control feature openings that includes a slide-dimmer switch opening, a preset switch opening, a toggle switch opening, a rocker switch opening, at least one receptacle opening, a ground fault circuit interrupter (GFCI) opening, an arc fault circuit interrupter (AFCI) opening, a lamp opening, a sensor opening, or a duplex receptacle opening.

29. A method for installing N-wiring devices within a wall box, N being an integer greater than or equal to one (1), the method comprising:

providing a left most wiring device of the N-wiring devices and mounting a left-end cap to an exterior portion of a left most wiring device, the left-end cap including a left-end cap finish surface;

providing a right most wiring device of the N-wiring devices and mounting a right-end cap to an exterior portion of a right most wiring device, the right-end cap including a right-end cap finish surface;

loosely mounting the remaining N-2 wiring devices to the wall box;

inserting N-1 alignment couplers between each of the N-wiring devices, each of the N-1 alignment couplers including a coupler finish surface, each of the N-1 alignment couplers including at least one fastening device disposed on either side of the coupler finish surface;

mounting each of the at least one fastening devices to an adjacent one of the N-wiring devices to thereby form a system of coupled and aligned wiring devices;

connecting the system of coupled and aligned wiring devices to the wall box; and covering each of the N-wiring devices with a wall plate.

30. The method of claim 29, each of the N-wall plates including a wall plate finish surface, the left-end cap finish surface, the right-end cap finish surface, the coupler finish surface(s), if any, and the wall plate finish surface(s) being substantially co-planar.

31. The method of claim 29, wherein N is an integer equal to one (1), and wherein the step of inserting N-1 alignment couplers is omitted.

32. The method of claim 29, wherein the N-wiring devices are substantially aligned in at least two-dimensional space.

33. The method of claim 29, wherein step of inserting further comprises:
removing a heat sink fin from a wiring device;
selecting an alignment coupler having a relatively narrow horizontal dimension, the relatively narrow horizontal dimension corresponding to an edge of a dimmer wiring device having a heat sink fin removed.

34. The method of claim 29, wherein step of inserting further comprises:
removing a heat sink fin from a wiring device;
selecting an alignment coupler having a relatively narrow horizontal dimension, the relatively wide horizontal dimension corresponding to an edge of a dimmer wiring device having a heat sink fin intact.

35. The method of claim 29, wherein the step of inserting an alignment coupler includes selecting an alignment coupler from a family of alignment couplers provided in at least two different widths.

36. The method of claim 29, wherein each of the N-wall plates includes a label window configured to hold a placard therein, and wherein the step of covering includes disposing a placard within the label window, the placard identifying the corresponding wiring device.

37. The method of claim 36, wherein the label window is accessible from an underside of the wall plate.

38. The method of claim 29, wherein at least one fastening device includes at least one pair of fastener holes.

39. The method of claim 29, further comprising the step of selecting a sequence of wiring devices within the wall box.

40. The method of claim 39, wherein the wiring devices includes a dimmer, fan speed control device, receptacle, switch, light, protective device, ground fault circuit interrupter (GFCI), arc fault circuit interrupter (AFCI), transient voltage surge suppressor (TVSS), sensor or some combination thereof.

41. A modular wall plate system accommodating N-wiring devices within a wall box, N being an integer greater than or equal to one (1), the system comprising:
a left-end cap configured to be mounted to an exterior portion of a left most wiring device of the N-wiring devices disposed in the wall box, the left-end cap including a left-end cap finish surface;
a right-end cap configured to be mounted to an exterior portion of a right most wiring device of the N-wiring devices disposed in the wall box, the right-end cap including a right-end cap finish surface;
N-1 alignment couplers disposed between each of the N-wiring devices, the N-1 alignment couplers being configured to align adjacent ones of the N-wiring devices in at least two-dimensions, each of the N-1 alignment couplers including a coupler finish surface; and
N-wall plates configured to cover each of the N-wiring devices, each of the N-wall plates including a wall plate finish surface and at least one series of venting slits disposed therein, the left-end cap finish surface, the right-end cap finish surface, the coupler finish surface (s), if any, and the wall plate finish surface(s) being substantially co-planar after the modular wall plate system accommodating N-wiring devices is installed within the wall box.

42. The system of claim 41, wherein the N-wall plates further comprise:
a plate member having the wall plate finish surface and configured to cover a wiring device, the plate member including a first aperture configured to provide a user with access to the wiring device; and
a label window disposed in the plate member, the label window including a second aperture disposed in the plate member and a lens element disposed in the second aperture on a finish side of the plate member, the label window further comprising a placard retention element disposed on an underside of the plate member, the retention element and the lens member forming a pocket configured to hold the placard for viewing through the lens element.

43. A modular wall plate system accommodating N-wiring devices within a wall box, N being an integer greater than or equal to one (1), the system comprising:
a left-end cap configured to be mounted to an exterior portion of a left most wiring device of the N-wiring devices disposed in the wall box, the left-end cap including a left-end cap finish surface;
a right-end cap configured to be mounted to an exterior portion of a right most wiring device of the N-wiring devices disposed in the wall box, the right-end cap including a right-end cap finish surface;
N-1 alignment couplers disposed between each of the N-wiring devices, the N-1 alignment couplers being configured to align adjacent ones of the N-wiring devices in at least two-dimensions, each of the N-1 alignment couplers including a coupler finish surface; and
N-wall plates configured to cover each of the N-wiring devices, each of the N-wall plates including a wall plate finish surface and a label window configured to hold a placard therein, the left-end cap finish surface, the right-end cap finish surface, the coupler finish surface(s), if any, and the wall plate finish surface(s) being substantially co-planar after the modular wall plate system accommodating N-wiring devices is installed within the wall box.

44. A modular wall plate system for mounting N-wiring devices in a multi-gang junction box, N being an integer greater than or equal to two (2), the system including: N-1 alignment couplers disposed between each of the N-wiring devices, the N-1 alignment couplers being configured to align adjacent ones of the N-wiring devices in three orthogonal dimensions, each of the N-1 alignment couplers including a coupler finish surface; and N-wall plates configured to cover each of the N-wiring devices, each of the N-wall plates being configured to mate with an adjacent alignment coupler and includes a wall plate finish surface, each coupler finish surface and wall plate finish surface being substantially co-planar, such that the modular wall plate system accommodates N-wiring devices installed within the wall box.

45. The system according to claim 44, wherein each of the N-1 alignment couplers is chosen from a family of alignment couplers having a width that is a function of a characteristic width of a wiring device.

46. The system according to claim 44, wherein at least two of the N-wiring devices have different characteristic widths.

47. The system of claim 46, wherein one wiring device has a one gang characteristic width and a second wiring device has a characteristic width greater than or equal to a one-and-a-half characteristic width.

* * * * *